(12) United States Patent
Dierickx (10) Patent No.: US 7,106,915 B2
(45) Date of Patent: Sep. 12, 2006

(54) METHODS AND DEVICES FOR READING OUT AN IMAGE SENSOR WITH REDUCED DELAY TIME BETWEEN LINES

(75) Inventor: Bart Dierickx, Mortsel (BE)

(73) Assignee: Cypress Semiconductor Corporation, Mechelen (BE)

( * ) Notice: Subject to any disclaimer, the term of this patent is extended or adjusted under 35 U.S.C. 154(b) by 753 days.

(21) Appl. No.: 09/906,405

(22) Filed: Jul. 16, 2001

(65) Prior Publication Data

US 2003/0011829 A1    Jan. 16, 2003

(51) Int. Cl.
*G06K 9/20*    (2006.01)
(52) U.S. Cl. ...................................... 382/312
(58) Field of Classification Search ................ 382/312, 382/321, 323, 324, 318; 348/294, 308, 311, 348/302, 312; 257/226, 235, E27.156, E27.157, 257/E27.159; 250/208.1, 208.3; 358/482, 358/483
See application file for complete search history.

(56) References Cited

U.S. PATENT DOCUMENTS

| | | | | |
|---|---|---|---|---|
| 4,465,939 A | * | 8/1984 | Tamura | 358/482 |
| 4,479,139 A | * | 10/1984 | Parrish | 257/226 |
| 4,532,551 A | * | 7/1985 | Kurata et al. | 358/494 |
| 5,381,106 A | * | 1/1995 | Limberg | 327/104 |
| 6,172,831 B1 | * | 1/2001 | Usui | 360/64 |
| 6,233,066 B1 | * | 5/2001 | Kojima et al. | 358/488 |
| 6,456,326 B1 | * | 9/2002 | Fossum et al. | 348/308 |
| 6,480,227 B1 | * | 11/2002 | Yoneyama | 348/308 |
| 6,859,231 B1 | * | 2/2005 | Sumi et al. | 348/302 |

* cited by examiner

*Primary Examiner*—Jose L. Couso
(74) *Attorney, Agent, or Firm*—Blakely, Sokoloff, Taylor & Zafman LLP (57) ABSTRACT

The present invention describes methods and devices for reading out an image sensor with reduced delay times between the reading out of different lines. The method of a first embodiment reads out each line of an image sensor in at least two overlapping sequences, whereby each sequence comprises a succession of blanking times and pixel readout periods. The timing of the sequences is such that the readout periods of different sequences are interleaved. The method of a second embodiment provides a high-speed column readout by discharging a column bus by a load current modulated in amplitude and time. The method of a third embodiment provides a high-speed column readout by precharging a column bus by a load current provided by connecting the column bus to a DC potential. Devices corresponding to each of the methods are also provided.

16 Claims, 5 Drawing Sheets

METHODS AND DEVICES FOR READING OUT AN IMAGE SENSOR WITH REDUCED DELAY TIME BETWEEN LINES

TECHNICAL FIELD OF THE INVENTION

The present invention relates to a method and a device for reading out an image sensor with reduced delay time between lines, possibly reduced up to zero.

BACKGROUND OF THE INVENTION

Solid state image sensors are well known, as they find a widespread use in camera systems. Commonly solid state image sensors are implemented in a CCD-technology or in a CMOS- or MOS-technology. In this embodiment, a matrix of light sensitive elements (photosensitive elements) in series with switching elements constitutes an image sensor, which is mounted in a camera system. The light sensitive elements may for example be photoreceptors, photo-diodes, phototransistors, or alike. Each light sensitive element receives an image of a portion of a scene being imaged. That portion is called a picture element or pixel. The image obtaining light sensitive elements produce an electrical signal indicative of the light intensity of the image. The electrical signal of a light sensitive element is typically a current, which is proportional to the amount of electromagnetic radiation (light) falling onto that light sensitive element.

The signal of said matrix of pixels is measured and multiplexed to a so-called video-signal.

Of the image sensors implemented in a CMOS- or MOS-technology, image sensors with passive pixels and image sensors with active pixels are distinguished. The difference between these two types of pixel structures is that a passive pixel does not perform signal amplification whereas an active pixel does.

A passive pixel sensor is simply a photodiode (MOS or p-n junction diode) with a transistor acting as a switch that passes photo-electrically generated signal charge to an amplifier outside the pixel array.

Figure 1:
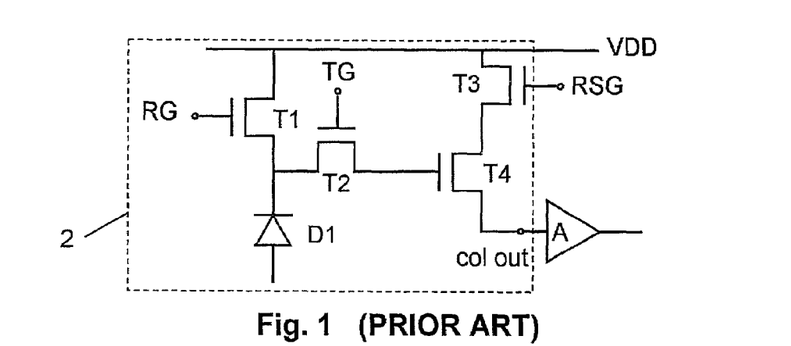
FIG. 1 is a CMOS active pixel sensor cell with four transistors and a photosensitive element according to the prior art.

The term "active pixel" refers to any pixel that has an active element integrated in the pixel, that is, at least one amplifier that typically comprises one or more transistors to amplify the charge that is collected on the light sensitive element in the pixel. Active pixels may also be equipped with additional electronics for more elaborate functions, such as filtering, high speed operation, or operation in more extreme illumination conditions. A commonly used CMOS active pixel sensor (APS) cell is represented in FIG. 1. It has four transistors T1, T2, T3, T4 and a photosensitive element D1. The cell has a transfer gate TG at a transfer transistor T2, separating the photosensitive element D1 from a capacitive 'floating diffusion' (which acts as a sample-and-hold capacitor), a reset gate RG at a reset transistor T1 between the floating diffusion and a power supply $V_{DD}$, a source-follower transistor T4 to buffer the floating diffusion from a readout-line capacitance, and a row-select gate RSG at a row select transistor T3 to connect the cell to the readout line. All pixels on a column connect to a common sense amplifier A.

In the active pixel sensor cell represented, as well as in many other APS cells, column buses are readout as a switched source follower: the driver transistor T4 is in the pixels, and the load transistor is common for all pixels of a column. A select MOSFET T3 acting as a switch connects the pixels to the column.

A simple image-capture cycle for the four-transistor active pixel sensor cell mentioned above is as follows. First the reset gate RG and the transfer gate TG are turned on to reset the photosensitive element D1 and floating diffusion potentials. Both gates RG, TG are then turned off. The photosensitive elements D1 on the pixels convert photons (light) into charge, and these light-induced electrons collect on the photosensitive elements D1. After the desired integration period, the transfer gate TG is turned on, and collected charge transfers to the floating diffusion capacitance. The resultant floating diffusion voltage charge appears on the source-follower output of transistor T4, which is read by connecting it to a readout line via the row-select gate RSG of row-select transistor T3. This cycle is repeated for each pixel capturing an image, and is repeated for each next image.

Figure 2:
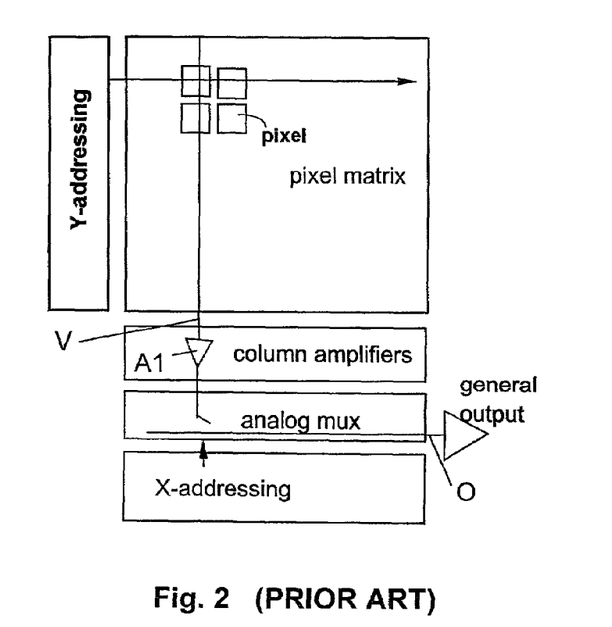
FIG. 2 is a signal readout scheme of a CMOS image sensor according to the prior art.

A classic way to read out an image sensor is line by line. A conventional signal readout scheme of a CMOS image sensor is shown in FIG. 2.

A horizontal scan register Y-addressing addresses all pixels of a line to be read out, whereby all row select switching elements of pixels of that line are closed at the same time. Therefore, each of those pixels puts a signal on a vertical output line V, where it is amplified in column amplifier A1. A vertical scan register X-addressing switches and multiplexes onto an output bus O the charges that have been put on the vertical output lines V.

Between reading out two subsequent lines is a so-called "blanking time" or "blanking period", which is a time period needed to do some image sensor housekeeping tasks, such as for example, but not limited thereto:
- changing the line address; as this involves the charging or discharging of reasonably long lines, this time is certainly not infinitely short;
- linewise parallel sampling and holding charges integrated in all pixels of a line;
- resetting of the latest line that was selected, in order to allow a new integration period to begin in that line;
- resetting of a different line than the one that was previously selected; this operation is often used to perform an "electronic shutter", which is the ability to control the integration time of a light sensitive pixel;
- subtracting the signal of a line and its reset level; this function is often used for fixed pattern noise cancellation.

In any case, there is a finite delay between the readout of the last pixel of the previous line and the first pixel of the next line, as the line address needs be changed. In the fastest possible configuration known in the prior art, the only function retained during he blanking period is the change of the line address, which corresponds to a change of the selected line to be read out.

For source followers, as in the pixel embodiment of FIG. 1, it is well known that their rise time is fast, but that their fall time is slow, as this is dictated by the discharge of the bus capacitance through the load MOSFET A, which acts as a current source. Therefore, as mentioned previously, even if change of the line address is the only function retained, as this involves the charging or discharging of reasonably long lines, this time is certainly not infinitely short. This discharge time is often the practical limitation on the time needed to change a line in an APS image sensor. Increasing the load current can speed up the discharge time, but this has practical limitations. The driver MOSFETs are inside the pixels (e.g. transistor T4 in FIG. 1), and are thus limited in area and therefore in driving power. If the load current is too large, the driver MOSFET in the pixels cannot counteract it, and the signal level on the bus collapses. Furthermore, all the load currents in parallel for all columns of the image sensor may represent a serious power dissipation, which may cause unacceptable heating of the chip or short battery life.

Figure 3:
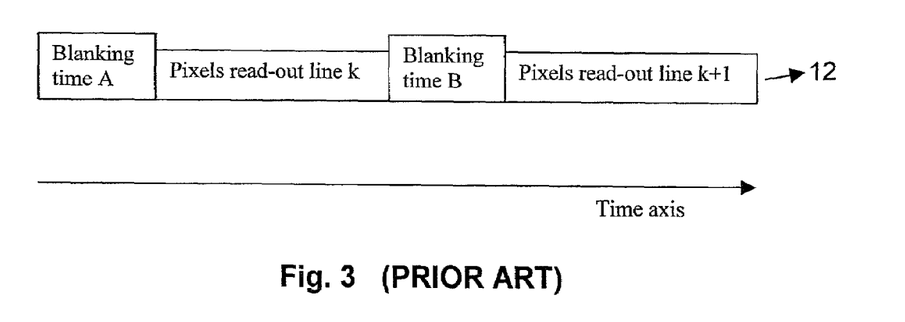
FIG. 3 shows a succession of pixel read out sequences and blanking periods, according to the prior art, in function of time.

A schematic representation of the conventional succession of pixel read out sequences and blanking periods is shown in FIG. 3. During blanking time A, the line address is changed so as to set line k as the next line to be read out, and possibly other tasks are performed during blanking time A as well. Thereafter all pixels of line k are read out and multiplexed on an output bus. Once all pixels of line k have been read out, a blanking time B occurs, during which the line address is changed so as to set line k+1 as the next line to be read out. Possibly other tasks are performed during blanking time B as well. Thereafter all pixels of line k+1 are read out and multiplexed on an output bus.

SUMMARY OF THE INVENTION

It is an object of the present invention to provide a method and a device for reading out an image sensor with reduced or zero delay time between the reading out of different lines.

According to a first embodiment of the present invention, this objective is accomplished by reading out each line of an image sensor or an intermediate readout of such a line in at least a first and a second overlapping sequence, whereby each sequence comprises an alternating succession of blanking times and pixel readout periods. The timing of the sequences is driven such that the readout periods of different sequences are interleaved, i.e. treated in alternating segments, preferably on a common bus. That way, at any moment in time, the readout periods of different sequences do not overlap. Preferably the readout periods of different sequences at any moment in time abut each other i.e. join nicely, such that readout with no interruption is obtained.

Each line of the image sensor or an intermediate readout of such a line may be read out in two overlapping sequences, or in more, say n, overlapping sequences. Generally, the blanking periods are short enough for two overlapping sequences to be sufficient. M of these n overlapping sequences may be interleaved, whereby m is not larger than n.

A read-out circuit for reading out pixel signals from a pixel array is also provided, each pixel signal having at least two sequences which overlap. The read-out circuit comprises at least two sample and hold stages which share one common output bus. A timing circuit causes the signals from the sample and hold stages to be interleaved on the same bus. Therefore at least one multiplexer outputs data from the sample and hold stages on the shared bus such that the outputted data does not overlap in time.

The read-out circuit may furthermore comprise registers for addressing the at least one multiplexer. Each register may be driven by a clock signal and a sync signal. If there is more than one register, they are driven simultaneously, but independently. According to a preferred embodiment, some of the signals, e.g. the clock signal, may be common for all registers. The clock signal may be derived from a master clock or from a set of master clocks.

According to a second embodiment of the present invention a high-speed column readout method is provided, whereby an image sensor is read out with reduced delay time between lines. The method according to the present invention comprises a quicker discharging a column bus of the image sensor, but with a lower power consumption (a reduced average dissipation) than in the state of the art. The discharging of the column bus comprises therefor a step of modulating a load current in amplitude and in time, this load current being used for discharging the column bus. Preferably, the load current is provided by current mirroring a discharge of a capacitor. The form of the modulation is a function which decreases with increasing time, preferably a quasi-exponential function or a step function.

A discharge device for quickly discharging a column bus of a pixel array of an image sensor is provided, comprising a modulator for modulating in amplitude and in time a load current for discharging the column bus of the image sensor.

Preferably, the discharge device comprises a current mirror with an input node and an output node. The output node of the current mirror is connected to the column bus. The input node of the current mirror is connected to a first side of a resistor and to a first plate of a capacitor. The resistor is connected with its second side to a first electrode of a power supply. The capacitor is connected with its second plate to another electrode of the power supply, e.g. ground. A switch is provided which, when closed, short-circuits the resistor and thus connects the first plate of the capacitor to the first electrode of the power supply. The switch is alternately opened and closed. In this way, the load current is provided by current mirroring the discharge of a capacitor.

Instead of one single switch, a combination of first and second switches may be provided, as well as driving means for mutually exclusively driving the switches. This means that one switch is open when the other is closed and vice versa. Here again, the switches are alternately opened and closed. If the first switch is closed, the series connection of the resistor and the capacitor is coupled between the ground and the supply voltage. If the second switch is closed, the resistor is short-circuited and the capacitor is connected with its first plate to the power supply.

According to a third embodiment of the present invention, a high-speed column readout method is provided, whereby an image sensor is read out with reduced delay time between lines. The method according to the present invention comprises pre-charging a column bus by a load current by connecting the column bus to a DC potential or a current source via a switch. A resistor may be connected between the switch and the DC potential or the current source. This DC potential may be ground potential or another low voltage, so that the column bus is subsequently ready for accepting a high voltage of the readout signal. The column bus pre-charge is done at a time on which no select line for an image element which is read out through the column bus is active.

The load current preferably decreases with increasing time: a high load current in the beginning of the pre-charging is meant to speed up the charging, and a low load current at the end of the pre-charging is there to maintain the pre-charging to a low dissipation level. The difference between the amplitude of the low load current and the amplitude of the high load current is at least a factor two. The high load current must last long enough to discharge at least 50% of the signal on the column bus.

A discharge device according to this embodiment is also provided. It comprises a switch, possibly in series with a first resistor or a first current source, between a column bus to be discharged and a DC potential, which may be ground potential or another low voltage.

A second current source is preferably connected in parallel over the series combination of the switch and the first resistor or first current source. This second current source may be formed by a resistor with high resistance value.

The present invention may also provide a timing circuit for generating any of the control signals required for implementing any of the above embodiments.

Other features and advantages of the present invention will become apparent from the following detailed description, taken in conjunction with the accompanying drawings, which illustrate, by way of example, the principles of the invention. The reference figures quoted below refer to the attached drawings.

In the different figures, the same reference figures refer to the same or analogous elements.

DESCRIPTION OF THE ILLUSTRATIVE EMBODIMENTS

In the following the present invention will be described with reference to certain embodiments and drawings but the present invention is not limited thereto but only by the claims. In particular, in all the embodiments of the present invention a timing circuit may be provided to generate the necessary signals such as clock signals or transistor drive signals.

First Embodiment

Figure 4:
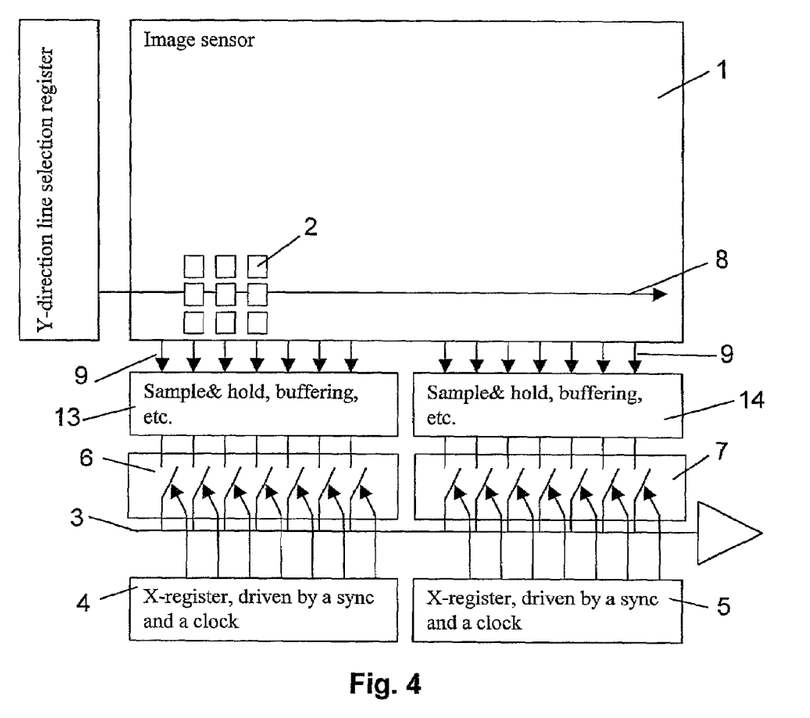
FIG. 4 is a signal readout scheme of a CMOS image sensor according to a first embodiment of the present invention presenting no delay time between reading out different lines.

FIG. 4 illustrates in diagrammatic form a preferred circuit for obtaining a reading out of an image sensor 1 with no delay time between the reading out of different lines or rows 8 of pixels 2.

The circuit comprises an image sensor 1 consisting of a matrix of pixels 2 arranged on N1 rows 8 and N2 columns. Each pixel 2 of the matrix comprises at least a photosensitive element (not represented) and a readout switch (not represented). M parallel output buses 3 are connected to the image sensor 1, whereby M is at least one, and is smaller than or equal to N1. Only one output bus is represented in FIG. 4. The output buses 3 may be analog buses or digital buses.

According to a first embodiment of the present invention, each of the output buses 3 is driven by at least two registers 4, 5 and the same number of multiplexers 6, 7. In the implementation of FIG. 4, two registers 4, 5 and two multiplexers 6, 7 drive the output bus 3. The timing of the registers 4, 5 and the multiplexer 6, 7 is such that the readout period of the first register 4 and multiplexer 6 does not overlap in time with the readout period of the second register 5 and multiplexer 7 outputting data on the shared output bus 3, but that instead these readout period nicely join in time. The readout periods of the first register 4 and the readout periods of the second register 5 are interleaved on the shared output bus 3. The timing signals for the registers 4, 5 may be provided by a dedicated timing circuit.

Figure 5:
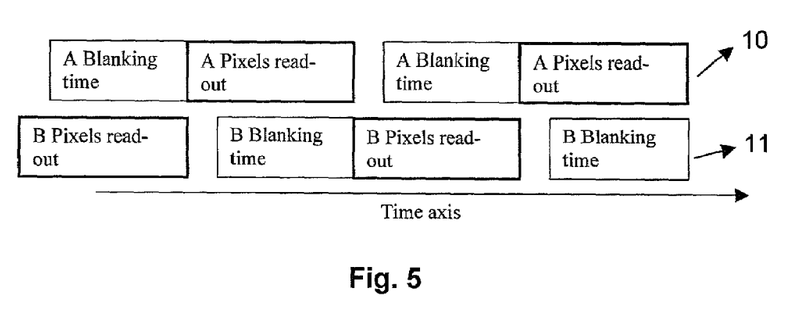
FIG. 5 shows a succession of pixel read out sequences and blanking periods, according to the signal readout scheme of FIG. 4, in function of time.

The prior art line sequence 12 on an output bus 3, which consists of blanking periods and readout periods, is replaced with a number of overlapping sequences 10, 11 equal to the number of registers 4, 5 and multiplexers 6, 7 driving that output bus 3. The overlapping sequences 10, 11 operate in parallel but are displaced in time, as shown in FIG. 5, in order for the readout periods "A pixels read-out", "B pixels read-out" to be interleaved, so that they nicely join and do not overlap. The pixel readout period of one sequence coincides with the blanking time of an other sequence.

The different multiplexers 6, 7 multiplexing data of one line 8, share the same output bus 3.

The output bus 3 is thus continuously and without interruption outputting data. For a given maximum peak data rate, the highest possible average/overall data rate is obtained.

Different circuit stages 13, 14, such as sample and hold stages, buffering etc. can be located between the column bus 9 and the multiplexers 6, 7.

In the embodiment of FIG. 4, the two registers 4, 5 have their own driving signals, generally comprising a clock and a sync signal. However, some of the signals, e.g. the clock, can be implemented as a common signal for the registers 4, 5. Furthermore, additional circuits can be made that derive these pulses from a master clock or from a set of master clocks. In particular, a timing circuit may be provided to generate these signals.

For reasons of clarity, the two registers 4, 5 per output bus 3 are represented as geometrically separate blocks in FIG. 4. According to another embodiment, the registers driving one bus may be interleaved or interweaved in any combination, for example odd columns being read out by a first register 4 and a first multiplexer 6, and even columns being read out by a second register 5 and a second multiplexer 7.

As a further embodiment, the selection of the lines 8 can also be dephased. This means that lines 8 are cut in half, and read out with 180° shift. An alternative to this is that lines are read out as a whole, but stored in two sample and hold stages, which are acting with a 180° phase shift.

Second Embodiment

Figure 6A:
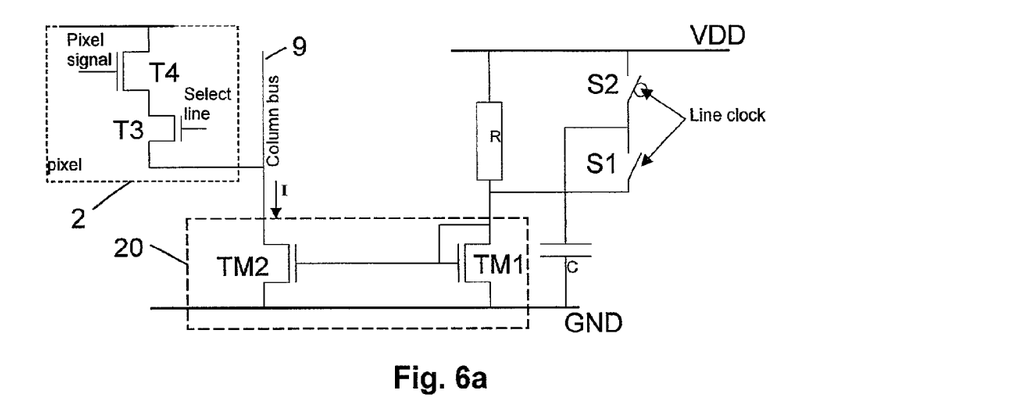
FIG. 6a shows a schematic circuit diagram of a pixel readout circuit with reduced delay time between reading out different lines, according to a second embodiment of the present invention.
Figure 6B:
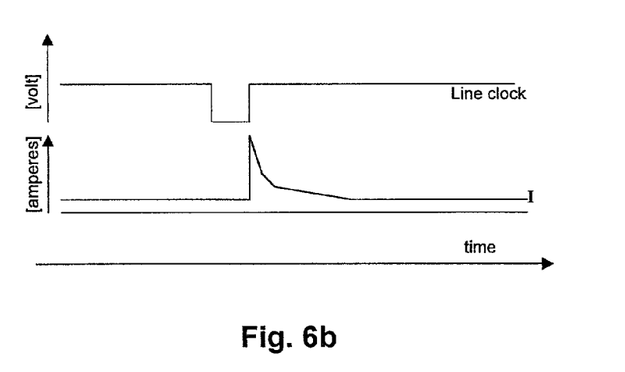
FIG. 6b is a representation of the voltage signals on the clock line, and of the current signal on the column bus to which all pixels of a column are connected.

Another embodiment of the present invention is described with relation to FIG. 6a and FIG. 6b. In FIG. 6a is shown a pixel 2, whereby only part of the internal pixel circuitry is represented, more particularly a source follower transistor T4, and a row select or line select transistor T3. At the gate of the source follower transistor T4 the pixel signal is received, which is the charge collected at a photosensitive element. The APS circuitry coming in front of the gate of source follower transistor T4 may be as represented in FIG. 1, or any other kind of active pixel.

The output of the pixel 2 is connected to a column bus 9, which is connected to the output of a current mirror 20. The input of the current mirror 20 is connected to a switched capacitor network. A high load current is given by current-mirroring a discharge of a capacitor C over a normal current mirror MOSFET configuration 20, comprising a first transistor TM1 and a second transistor TM2. A resistor R is connected between a positive power supply VDD and the input node of the current mirror 20. A capacitor C is connected between the input node of the current mirror and the ground. A set of switches S1, S2 is provided, of which one is open when the other is closed, and which either do include the resistor R in the readout circuit, or exclude it from the readout circuit while connecting the drain of the first transistor TM1 of the current mirror 20 to the positive power supply VDD.

During a first period in time, a line clock is high (provided by a clock circuit), as can be seen in FIG. 6b, which means that switch S1 is closed and switch S2 is open. Both resistor R and capacitor C are included in the readout circuit. A current I, the value of which depends on the value of the resistor R, goes through a first transistor TM1 of the current mirror, and, mirrored by the current mirror circuit 20, also through the second transistor TM2 of the current mirror 20, and thus through the column bus 9.

When the clock signal goes low, the switches S1 and S2 change state, i.e. switch S1 opens and switch S2 closes. The resistor R is excluded from the readout circuit as it is short-circuited by the closed switch S2, thus connecting the drain of the first transistor TM1, and also a first node of the capacitor C to the positive power supply, the second node of the capacitor C being tied to the ground. The capacitor C is being charged.

When the clock signal goes high again, switches S1 and S2 again switch states, i.e. switch S1 closes and switch S2 opens, thus reconnecting resistor R between the first node of the capacitor and the positive power supply. The capacitor C discharges, thus generating a peak current through the first transistor TM1 of the current mirror 20, and therefore generating a high load current to the column bus 9.

The peak current must be tuned in amplitude and time of occurrence, to speed up the eventual discharge of the columns when selecting a new line of pixels. This is done by correctly choosing the values of the resistor R and the capacitor C.

The timing signals necessary to implement the second embodiment may be provided by a timing circuit.

Third Embodiment

Figure 7:
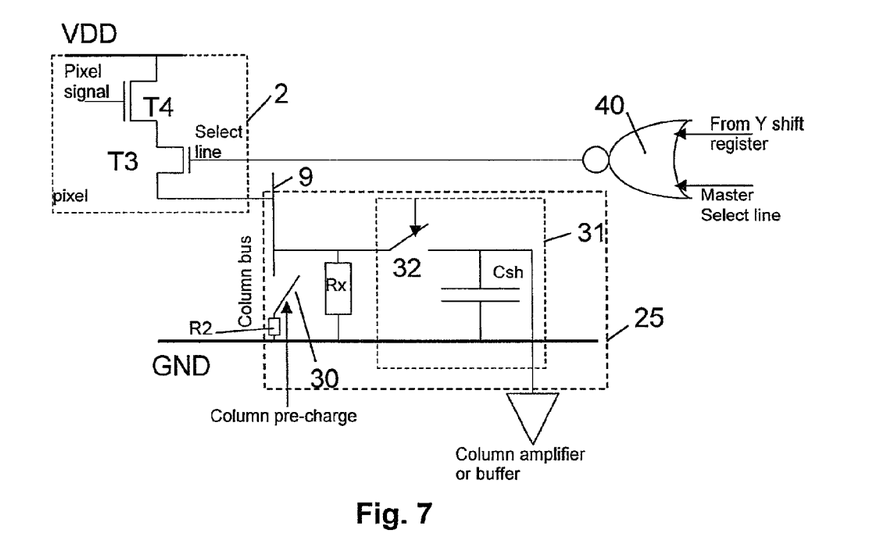
FIG. 7 shows a schematic circuit diagram of a pixel readout circuit with reduced delay time between reading out different lines, according to a third embodiment of the present invention.

A further embodiment of the present invention is described with respect to FIG. 7. Again, there is shown a pixel 2, whereby only part of the internal pixel circuitry is represented, more particularly a source follower transistor T4, and a row select or line select transistor T3. At the gate of the source follower transistor T4, the pixel signal is received, which is the charge collected at a photosensitive element in the pixel. The APS circuitry laying in front of the gate of source follower transistor T4 may be as represented in FIG. 1, or any other kind of active pixel.

The row select transistor T3 is preferably driven by the output of a NOR gate 40, the inputs of which come from a master select line and from an Y shift register. The Y shift register will point a "1" towards one line only. The master select line is a control in common for all lines of the whole imager. This control can thus disable all select lines, or enable just one (namely the one pointed at by the Y shift register). Only if both input signals are low, the gate of the row select transistor T3 goes high, and the pixel 2 can put a value on the column bus 9.

The output of the pixel 2 is connected to a column bus 9, which is connected to a circuit 25 for pre-charging or pre-discharging the bus 9. In the scheme of FIG. 7, the column bus is discharged to a DC potential, which is the ground (GND), prior to selecting the line of pixels. The column bus 9 can as well be pre-discharged to another value of DC potential.

The circuit for pre-charging or pre-discharging the column bus 9 comprises a switch 30 which, when closed, connects the column bus 9 to a DC potential, e.g. to the ground. A resistor or current source R2 may be coupled in series with the discharge switch 30. A resistor or current source Rx may be coupled in parallel over the switch 30, or over the switch 30 and resistor or current source R2 series connection. If the value of a resistor or current source Rx coupled in parallel over the discharge switch 30, or over the switch 30 and resistor or current source R2 series connection, is very high or even infinite, the DC dissipation is made very low.

Discharging the column bus 9 over a switch 30 is generally much faster than the discharge over a current source MOSFET. A switch is effectively short-circuited when closed, and has effectively infinite impedance when open. A current source would be weakly discharging the column bus all the time, while a switch would be fastly discharging the column bus all the time.

In each readout cycle, the column bus 9 must be re-charged to its final level by the driver MOSFET in the pixel, e.g. by transistor T4 if the pixel is as represented in FIG. 1. The combination of a pre-discharge and a re-charge is considerably faster than a normal settling time of a MOSFET source follower.

The column pre-charge should be active during a time that no select line is active. In FIG. 7, an optional sample and hold stage 31 is connected to the column bus 9. This sample and hold stage 31 consists of a switch 32 and a capacitor Csh. The sample and hold stage 31 serves to keep a stable sample of the column voltages over a longer period of time. If the pixel 2 has put a value on the column bus 9, and switch 32 has been closed, the value is sampled on capacitor Csh. Switch 32 is opened, while capacitor Csh still holds the readout value of pixel 2. The column bus 9 may now be discharged by closing switch 30.

The timing signals necessary to implement the third embodiment may be provided by a timing circuit.

Fourth Embodiment

Figure 8:
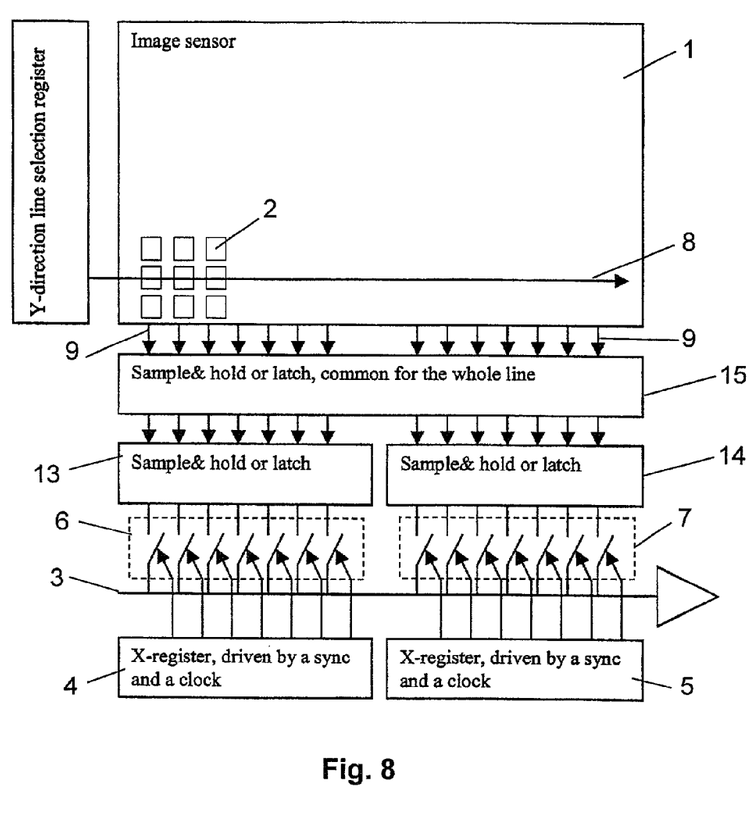
FIG. 8 is a signal readout scheme of a CMOS image sensor according to a fourth embodiment of the present invention.

FIG. 8 illustrates in diagrammatic form a circuit for obtaining a reading out of an image sensor 1 with no delay time between the reading out of different lines or rows 8 of pixels 2, in case for example flash illumination occurs.

In case of a device as described with relation to FIG. 4, lines 8 are left/right sample halves at different times. In case of flash illumination, due to the time difference between reading out the first half and the second half of one line or row 8 of pixels 2, only one half of the line or row 8 gives an image of the flash illumination.

In order to avoid this, and to make the device synchronous, according to a fourth embodiment of the present invention, an intermediate readout of one line or row 8 of pixels 2 as a whole is done. For each line 8, an intermediate latch or sample and hold stage 15 common for that whole line 8 is provided to store the pixel values of that line 8. This intermediate latch or sample and hold stage 15 is then read out as the reading out described with relation to FIG. 4.

The timing signals necessary to implement the fourth embodiment may be provided by a timing circuit.

Fifth Embodiment

Figure 9:
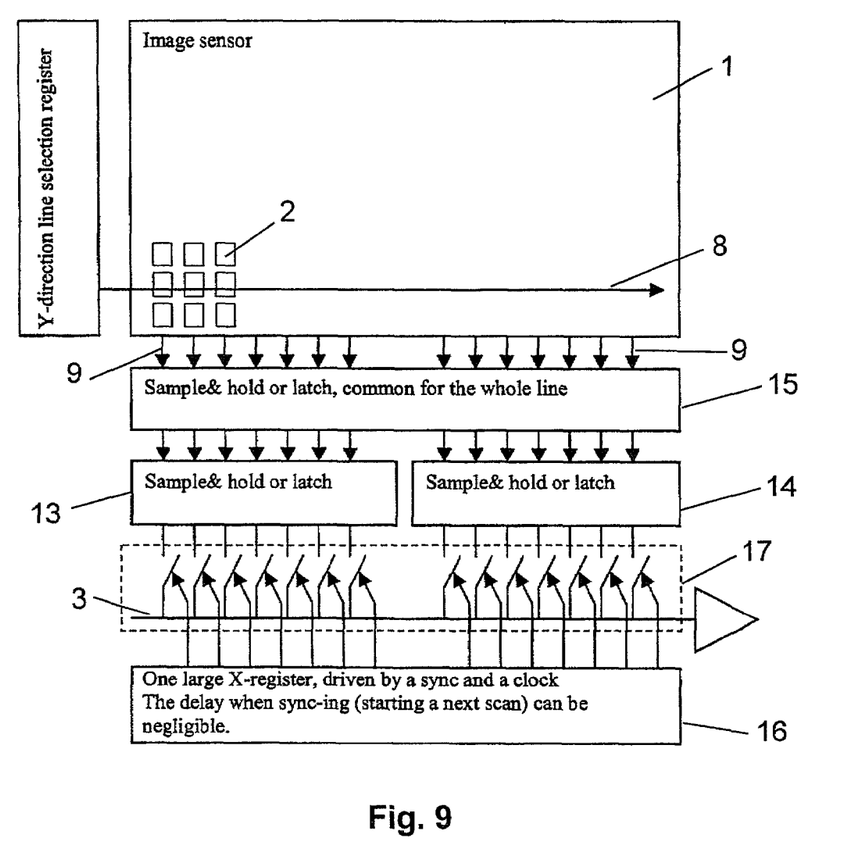
FIG. 9 is a signal readout scheme of a CMOS image sensor according to a fifth embodiment of the present invention.

FIG. 9 illustrates in diagrammatic form a circuit for obtaining a reading out of an image sensor 1 with no delay time between the reading out of different lines or rows 8 of pixels 2, making use of a digital X-register.

The circuit comprises an image sensor 1 consisting of a matrix of pixel elements 2 arranged on N1 rows 8 and N2 columns. Each pixel element 2 of the matrix comprises at least a photosensitive element (not represented) and a read-out switch (not represented). M parallel output buses are connected to the image sensor 1, whereby M is at least one, and is smaller than or equal to N1. Only one output bus 3 is represented in FIG. 9.

The pixel data from one line 8, either stored on an intermediate latch or sample and hold stage 15 as described with relation to FIG. 7 or not, is interleaved on the sample and hold stages 13 and 14.

According to the fifth embodiment of the present invention, each output bus 3 is driven by one digital X-register 16 and one multiplexer 17. Firstly, all pixel signals stored in the first sample and hold stage 13 are put on the common bus 3 by the multiplexer 17 and register 16. While doing this, the intermediate latch or sample and hold stage 15 can already store charges integrated in all pixels of the next line. Once all pixel signals stored in the first sample and hold stage 13 are put on the common bus, the multiplexer 17 and register 16 can start putting on the common bus pixel signals stored in the second sample and hold stage 14. During that time, the first sample and hold stage can already sample picture signals from the next line. Immediately after a readout period of a whole line, a new readout period may start, whereby the delay between the two readout periods is very short because a digital X-register 16 is used. The necessary control signals may be provided by a timing circuit.

While the invention has been shown and described with reference to preferred embodiments, it will be understood by those skilled in the art that various changes or modifications in form and detail may be made without departing from the scope and spirit of this invention.

The invention claimed is:

1. A read-out circuit for reading out pixel signals from a pixel array of an image sensor, comprising:
   a row select register coupled with a pixel array to select first and second rows in the pixel array;
   a first column select register coupled with a first group of columns in the first row and the second row and a second column select register coupled with a second group of columns in the first row and the second row;
   a first multiplexer to read out pixels in the first group of columns and a second multiplexer to read out pixels in the second group of columns; and
   drive circuitry to control pixel readout, the drive circuitry configured to
   read out pixels in the first group of columns in the first row in a first readout period while pixels in the second group of columns in the first row are addressed,
   read out pixels in the second group of columns in the first row in a second readout period while pixels in the first group of columns in the second row are addressed, wherein the second readout period is contiguous and non-overlapping with the first readout period, and
   read out pixels in the first group of columns in the second row in a third readout period while pixels in the second group of columns in the second row are addressed, wherein the third readout period is contiguous and non-overlapping with the second readout period.

2. A read-out circuit according to claim 1, further comprising a discharge device to discharge a column bus of the pixel array, the discharge device comprising a modulator to amplitude modulate a load current of the column bus.

3. A read-out circuit according to claim 2, wherein the discharge device comprises:
   a current mirror coupled with a first electrode of a power supply, the current mirror having an input node and an output node, the output node connected with the column bus;
   a resistor coupled between the input node and a second electrode of the power supply;
   a capacitor coupled between the input node of the current mirror and the first electrode of the power supply; and
   at least one switch coupled between the input node and the second electrode of the power supply to short-circuit the resistor and to couple the capacitor between the first electrode and the second electrode for a time period.

4. A read-out circuit according to claim 3, wherein a first switch and a second switch are provided, further comprising means for driving the first switch and the second switch out of phase, wherein if the first switch is closed, the resistor and the capacitor are connected in series between the second and first electrodes of the power supply, and wherein if the second switch is closed, the resistor is short-circuited and the capacitor is coupled between the first electrode and the second electrode of the power supply.

5. A read-out circuit according to claim 1, further comprising a pre-charge device for pre-charging a column bus of the pixel array, the pre-charge device comprising a switch connected between the column bus and one of a DC potential and a current source.

6. A read-out circuit according to claim 5, further comprising a first resistor connected between the switch and the one of the DC potential and the current source.

7. A read-out circuit according to claim 5, wherein a second current source is connected between the column bus and the one of the DC potential and the current source.

8. A read-out circuit according to claim 5, wherein a second resistor is connected between the column bus and the one of the DC potential and the current source.

9. A method in an image sensor, comprising:
   separating rows of an image sensor array into at least a first group of columns and a second group of columns;
   reading out pixels in the first group of columns in a first row of the image sensor array in a first read time period while pixels in the second group of columns in a second row of the image sensor array are addressed; and
   reading out the pixels in the second group of columns in the second row of the image sensor array in a second read time period, wherein the second read time period is contiguous and non-overlapping with the first read time period.

10. A method according to claim 9, further comprising multiplexing the pixels from the first group of columns and the pixels from the second group of columns on a shared bus.

11. A method according to claim 9, wherein the rows of the image sensor array each comprise n pixels in m groups of columns, and wherein m is less than or equal to n.

12. A method according to claim 9, further comprising:
   connecting a column bus to one of a DC potential and a current source through a switch; and
   pre-charging the column.

13. A method according to claim 12, wherein the switch is connected to the one of the DC potential and the current source via a resistor.

14. A method according to claim 12, wherein the column bus is coupled to a plurality of pixels in a corresponding plurality of image sensor lines, further comprising discharging the column bus when none of the plurality of pixels is selected for readout.

15. A method according to claim 11, further comprising interleaving the pixel groups on m buses.

16. A method for eliminating readout delay in an image sensor, comprising:
   reading a first group of pixels in a first row of pixels in a first readout period while addressing a second group of pixels in the first row of pixels;
   reading the second group of pixels in the first row in a second readout period while addressing a first group of pixels in a second row of pixels, wherein the second readout period is contiguous and non-overlapping with the first readout period; and
   reading the first group of pixels in the second row of pixels in a third readout period while addressing a second group of pixels in the second row of pixels, wherein the third readout period is contiguous and non-overlapping with the second readout period.

* * * * *